(12) United States Patent
Shimizu et al.

(10) Patent No.: US 12,305,292 B2
(45) Date of Patent: May 20, 2025

(54) USE OF REACTIVE FLUIDS IN ADDITIVE MANUFACTURING AND THE PRODUCTS MADE THEREFROM

(71) Applicant: Matheson Tri-Gas, Inc., Basking Ridge, NJ (US)

(72) Inventors: Hideharu Shimizu, Longmont, CO (US); Mark W. Raynor, Longmont, CO (US); Daniel Tempel, Erie, CO (US); Junpin Yao, Longmont, CO (US); Larry Wagg, Longmont, CO (US); Robert Torres, Jr., Parker, CO (US)

(73) Assignee: Matheson Tri-Gas, Inc., Basking Ridge, NJ (US)

( * ) Notice: Subject to any disclaimer, the term of this patent is extended or adjusted under 35 U.S.C. 154(b) by 312 days.

(21) Appl. No.: 15/389,629

(22) Filed: Dec. 23, 2016

(65) Prior Publication Data

US 2017/0182558 A1    Jun. 29, 2017

Related U.S. Application Data

(60) Provisional application No. 62/271,901, filed on Dec. 28, 2015.

(51) Int. Cl.
*B22F 10/28* (2021.01)
*B23K 10/02* (2006.01)
(Continued)

(52) U.S. Cl.
CPC ............ *C23C 24/103* (2013.01); *B22F 10/28* (2021.01); *B23K 10/027* (2013.01); *B23K 15/0086* (2013.01); *B23K 15/0093* (2013.01); *B23K 15/10* (2013.01); *B23K 26/126* (2013.01); *B23K 26/127* (2013.01); *B23K 26/342* (2015.10);
(Continued)

(58) Field of Classification Search
CPC ..... B23K 26/126; B22F 3/1055; B22F 1/0088
See application file for complete search history.

(56) References Cited

U.S. PATENT DOCUMENTS 5,182,170 A    1/1993  Marcus
5,837,960 A *  11/1998 Lewis .................. B29C 64/153
                                                         219/121.63

(Continued)

FOREIGN PATENT DOCUMENTS

WO    WO2015106113    7/2015
WO    2015175167      11/2015

OTHER PUBLICATIONS

ASM International Handbook Committee. (1991). ASM Handbook, vol. 04—Heat Treating—42.4 Furnace Atmosphere Gas Reactions. ASM International. (Year: 1991).*

(Continued)

*Primary Examiner* — Nicholas A Wang

(57) ABSTRACT

The present invention generally relates to methods and apparatuses adapted to perform additive manufacturing (AM) processes and the resulting products made therefrom, and specifically, to AM processes that employ an energy beam to selectively fuse a base material to produce an object. More particularly, the invention relates to methods and systems that use reactive fluids to actively manipulate the surface chemistry of the base material prior to, during and/or after the AM process.

17 Claims, 3 Drawing Sheets

(51) Int. Cl.
  B23K 15/00       (2006.01)
  B23K 15/10       (2006.01)
  B23K 26/12       (2014.01)
  B23K 26/342      (2014.01)
  B23K 26/38       (2014.01)
  B23K 26/60       (2014.01)
  B29C 64/10       (2017.01)
  B33Y 10/00       (2015.01)
  B33Y 30/00       (2015.01)
  C23C 24/10       (2006.01)
  B22F 10/32       (2021.01)
  B22F 10/34       (2021.01)
  B22F 10/73       (2021.01)
  B22F 12/13       (2021.01)
  B22F 12/17       (2021.01)
  B29C 64/314      (2017.01)

(52) U.S. Cl.
  CPC .............. *B23K 26/38* (2013.01); *B23K 26/60* (2015.10); *B29C 64/10* (2017.08); *B33Y 10/00* (2014.12); *B33Y 30/00* (2014.12); *B22F 10/32* (2021.01); *B22F 10/34* (2021.01); *B22F 10/73* (2021.01); *B22F 12/13* (2021.01); *B22F 12/17* (2021.01); *B22F 2999/00* (2013.01); *B29C 64/314* (2017.08); *Y02P 10/25* (2015.11)

(56) References Cited

U.S. PATENT DOCUMENTS

| | | | | |
|---|---|---|---|---|
| 6,423,255 | B1* | 7/2002 | Hoechsmann | B33Y 10/00 |
| | | | | 264/113 |
| 7,241,415 | B2* | 7/2007 | Khoshnevis | B22F 3/008 |
| | | | | 419/6 |
| 7,531,117 | B2* | 5/2009 | Ederer | B22C 9/10 |
| | | | | 264/113 |
| 8,741,194 | B1* | 6/2014 | Ederer | B22C 9/00 |
| | | | | 264/113 |
| 10,315,357 | B2* | 6/2019 | Riman | C04B 35/22 |
| 2004/0182510 | A1 | 9/2004 | Pfeifer | |
| 2005/0233090 | A1* | 10/2005 | Tapphorn | B05D 3/00 |
| | | | | 427/532 |
| 2012/0202012 | A1* | 8/2012 | Grebe | B29C 67/0077 |
| | | | | 428/172 |
| 2014/0053956 | A1 | 2/2014 | Etter | |
| 2014/0178241 | A1* | 6/2014 | Mironets | B22F 12/00 |
| | | | | 419/31 |
| 2014/0370323 | A1* | 12/2014 | Ackelid | B22F 3/24 |
| | | | | 428/548 |
| 2015/0028523 | A1 | 1/2015 | Jaker | |
| 2015/0035209 | A1 | 2/2015 | Shah | |
| 2015/0125333 | A1 | 5/2015 | Bruck et al. | |
| 2016/0067779 | A1* | 3/2016 | Dautova | B29C 64/153 |
| | | | | 419/7 |
| 2016/0271878 | A1* | 9/2016 | Nuechterlein | C22C 1/10 |
| 2017/0095858 | A1* | 4/2017 | Stankowski | B22F 1/0088 |
| 2017/0129060 | A1* | 5/2017 | Szuromi | F01D 5/288 |
| 2017/0165791 | A1* | 6/2017 | Kamachi | B22F 12/00 |

OTHER PUBLICATIONS

Koptyug, A. et al. "Additive manufacturing technology applications targeting practical surgery." 2013, International journal of life science and medical research. 3. p. 15-24. (Year: 2013).*

Bai, Y. et al. "An exploration of binder jetting of copper." Mar. 2015. Rapid Prototyping Journal. 21. 2. p. 793-814. (Year: 2015).*

Jarvinen, Jukka-Pekka, "Characterization of effect of support structures in laser additive manufacturing of stainless steel", Physics Procedia, 2014; 56:72-81. Published by Elsevier B.V.

Markegard, Leif, "Residual stress after surface hardening—an explanation of how residual stress is created", Conference in Honour of Prof. Bozidar Liscic, New Challenges in Heat Treatment and Surface Engineering, 2009; pp. 359-366 (Croatian Society for Heat Treatment and Surface Engineering) CSHTSE), Zagreb; 2009).

* cited by examiner

USE OF REACTIVE FLUIDS IN ADDITIVE MANUFACTURING AND THE PRODUCTS MADE THEREFROM

CROSS REFERENCE TO OTHER APPLICATIONS

This application claims benefit of priority to U.S. Provisional Application No. 62/271,901, filed Dec. 28, 2015, the disclosure of which is fully incorporated herein by reference.

BACKGROUND OF THE INVENTION

1. Field of the Invention

The present invention generally relates to methods and apparatuses adapted to perform additive manufacturing (AM) processes and the resulting products made therefrom, and specifically, to AM processes that employ an energy beam to selectively fuse a material to produce an object. More particularly, the invention relates to methods and systems that use reactive fluids to actively manipulate the surface of a material prior to and/or during the AM process.

2. Description of the State of the Art

AM processes, also referred to as three dimensional printing, is an established but growing technology. In its broadest definition, AM processes involve the fabrication of a three-dimensional object through the deposition of successive layers of material to make a net or near net shape (NNS). AM encompasses various manufacturing and prototyping techniques known under a variety of names, including freeform fabrication, 3D printing, rapid prototyping/tooling, etc. AM techniques are capable of fabricating complex components from a wide variety of materials.

While a large number of AM processes are now available a particular type of AM process uses an energy beam, for example, an electron beam or electromagnetic radiation such as a laser beam, to sinter or melt a material, such as a powder, rod, wire or liquid, creating a solid three-dimensional object in which particles of the powder material are bonded together. The methods most often used with powder materials are electron-beam melting (EBM), selective laser melting (SLM) or direct metal laser sintering (DMLS), selective laser sintering (SLS), fused deposition modeling (FDM), fused filament fabrication (FFF), or powder bed and inkjet head 3D printing (3DP), these powder bed process are collectively referred to herein as laser powder deposition or laser additive manufacturing (LAM). SLS is a notable AM process for rapid fabrication of functional prototypes and tools by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions on the surface of the powder material that make the process very complex.

Although the various forms of LAM offer great potential for fabricating and repairing complex objects, they are limited by certain disadvantages which often inhere to the use of powder materials. One disadvantage relates to the reactivity of the surface of the powder materials with components in air such as oxygen and nitrogen. When the powdered materials comprise reactive metals such as iron, aluminum and titanium the surface of these metallic particles can react with air to form microstructural defects (e.g., voids, impurities, or inclusions) in the final product. Such defects can lead to catastrophic failure. The impurities include metal oxides, and metal nitrides, and the rate of such defects whether impurities, voids or inclusions generally increases as the surface area of the powdered materials increase.

In the past, powdered materials have been formed in low-oxygen containing environments to reduce undesired chemical reactions; however, handling low-oxygen-containing powder materials in inert atmospheres from the point of powder production to the point of actual usage in AM processes significantly increases the cost of powder production, powder-size classification, delivery, and safety requirements, due to the highly explosive nature of low-oxygen-containing metallic powders. Unfortunately, the existence of oxides or other impurities at the surface of the powdered materials that are not handled this way prevents the adhesion of powders for fabricating metallic products, thereby degrading the mechanical properties of fabricated products. The grain structure with more/larger pores and disorder of grains, derived from temperature gradient during the process, also causes the residual stress in fabricated products.

Powder materials also tend to readily adsorb moisture which in the case of metallic powders results in the formation of metal oxides and may also lead to unwanted porosity in metallic objects formed using laser powder deposition. For high strength steels the moisture is also a source of hydrogen that forms on the powders' surface and within the fabricated product resulting in delayed cracking or hydrogen embrittlement.

To further mitigate the harmful effects of air and moisture on powder materials, the melt pool resulting from laser powder deposition is often shielded by applying an inert gas, such as argon and helium. However, such shielding does not remove already existing oxides that tend to form on the outside of metal powders during manufacture, storage and handling. As a result, such oxide coated metal fillers must often be reduced during melt processing to avoid porosity and other defects in the resulting metallic deposit. Post-deposition processes such as hot isostatic pressing (HIP) are also often used to collapse pores (voids), inclusions and cracks in order to improve the properties of laser-deposited metals. To prevent moisture adsorption it is also common to store metal powder fillers in pre-heated hoppers. Such protective and post-processing measures are particularly important for metallic powders containing highly reactive metals (e.g., superalloys) and for fine powders having high surface areas.

Alternatively, other techniques to mitigate the harmful effects of air attempt to shield the melt pool resulting from laser powder deposition by employing a flux together with powder material to remove impurities. See, US 2013/0136868 publication. Flux prevents the fabricated products from reacting with atmospheric gases, much like the shielding gases or gas mixtures discussed above; however, flux is a solid material and sometimes is incorporated into the fabricated materials.

Often times it is necessary to pre-treat raw powder materials used in some of the AM processes. Pre-treatment may include coating, degassing and heat treating the powder. Degassing can be used to remove water vapor from the powder particles. Surfaces of the powder can become oxidized very quickly during the manufacturing process when exposed to the environment. Water vapor can absorb into the oxide, which can cause voids in the material formed with the additive manufacturing process. Methods of removing water from the manufactured materials can cause the forming of hydrogen which can make the final material more brittle. Previous methods of removing water vapor from the powder include various methods of degassing. For example, Chinese patent No. CN105593185A describes a way to produce low-oxygen containing metallic Ti powders by utilizing hydrogen atmosphere and the hydrogen embrittlement. However, avoiding reactions with oxygen result in safe delivery/handling complications because low-oxygen containing metallic powders are highly explosive.

Additionally, traditional methods employ hydrogen for reducing bulk metal oxide at high temperature enough for reducing reactions after the fabrication by metallic oxide paste, see US 2013/0136868 are also found wanting as it is difficult to reduce oxide in the inside of fabricated products due to the difficulty of gas penetration and diffusion. High temperature heat treatment of gases can cause unwanted sintering of the powder.

In view of the above, it can be appreciated that there are certain problems, shortcomings or disadvantages associated with LAM techniques, and that it would be desirable if improved methods and equipment were available and capable of producing near-net-shape objects to close tolerances and/or to have high quality surface finishes, and/or capable reducing or eliminating cracks, inclusions, and pores between deposit layers in a finished object. Accordingly, an improved system for laser additive manufacturing, is necessary which allows for active manipulation of the surface of a material prior to and/or during the additive manufacturing process by introduction of one or more reactive fluids or fluid mixtures that react with the surface of the base material, such as but not limited to a powder, plasma, rod, wire or liquid, being deposited such that different portions of the deposited base material can be made to possess different base material properties. By controlling/reforming/modifying the surface of a base material the resulting mechanical and/or chemical properties of a fabricated object may be enhanced through manipulation of the surface properties of the base material.

BRIEF SUMMARY OF THE INVENTION

The present invention provides a method and apparatus suitable for use in AM (additive manufacturing) techniques, wherein a reactive fluid is contacted with a base material, such as but not limited to a powder, plasma, rod, wire or liquid wherein the reactive fluid modifies the surface of the base material to have a desired chemistry prior to, during or after the application of an energy beam which is used to selectively sinter (fuse) or melt the base material to produce a 3D object.

According to a first aspect of the invention, the chemical composition of the surface of the base material is controlled/reformed/modified before, during and/or after the AM process by introduction of one or more reactive fluids or fluid mixtures that chemically react with the surface of the base material. Fluids including gas mixtures containing hydrogen, carbon monoxide or other gas components that chemically reduce surface oxides and/or otherwise clean or remove impurities on the surface of materials such as solid powders are used instead of or in addition to pure purge gases (e.g. He, Ar or $N_2$) in the chamber itself, as well as in the metallic-powder-delivery line, the metallic-powder-delivery container, or in the used-metallic-powder receiver.

The present invention includes the treatment of the material by a gas or gases including gas mixtures could be employed to recycle, for example, used metallic powders, which leads to the cost reduction of powders. At the same time, the gases with higher thermal conductivity (e.g. He) could be employed as a purge gas or a balance gas, which is effective to reduce the residual stress derived from temperature gradients.

The present invention may further employ gases including gas mixtures to remove hydrogen in the base materials or fabricated products and/or intentionally oxidize the surface of the base materials. As discussed previously, hydrogen on the base material's surface and within fabricated products are known to cause hydrogen embrittlement. According to the present invention, gases including gas mixtures containing CO, $CO_2$, and/or fluorocarbons are utilized to remove hydrogen to enhance the mechanical strength of fabricated products.

The present invention further contemplates the use of gases including gas mixtures to form nitride, carbide, boride, phosphide, silicide or other chemical layer on the surface of base materials, such as but not limited to metallic powders to enhance the wear resistance or corrosion resistance of the fabricated products.

Any combinations of these gases can be used to form binary, ternary, or higher order compounds such as nitride and boride at the same time.

It is further contemplated that gases/fluids including their mixtures may be used to alter the alloy composition of the base material before, during and/or after additive manufacturing. Gases/fluids containing volatile organometallic components can be used to introduce or deposit metals by chemical vapor deposition, atomic layer deposition or other process on the surface of powders as they are used in the 3D printing process.

It is further contemplated that the use of reactive fluids including their mixtures would be ideally suited for use with stand alone laser cutting processes or in combination with the AM process. In this instance it is contemplated that a fabricated object could be further shaped through the use of a laser which cuts by melting, burning or vaporizing the base material. After and/or during the cut the surface of the fabricated object would be exposed to the reactive fluid(s) and/or mixtures thereof so that the entire surface of the fabricated object will have the same desired chemistry.

A technical effect of the invention is the ability to improve the mechanical properties such as higher wear resistance, higher corrosion resistance, higher mechanical strength, and lower residual stress of the metallic products fabricated by LAM. Without wishing to be limited to any particular theory, it is believed that the mechanical and/or chemical properties of fabricated products rely on the chemical compositions and the grain structures of the matrix and surface of fabricated products as well as the base materials employed in the process. The existence of oxides or other impurities at the surface of the base materials prevents the adhesion of the base materials for fabricating products, which degrades the mechanical properties of fabricated products. The grain structure with more/larger pores and disorder of grains, derived from temperature gradient during the process, also causes the residual stress in fabricated products.

Additional embodiments and features are set forth in the description that follows, and in part will become apparent to those skilled in the art upon examination of the specification or may be learned by the practice of the disclosed embodiments. The features and advantages of the disclosed embodiments may be realized and attained by means of the instrumentalities, combinations, and methods described in the specification.

BRIEF DESCRIPTION OF THE DRAWINGS

A further understanding of the nature and advantages of the disclosed embodiments may be realized by reference to the remaining portions of the specification and the drawings.

Figure 1:
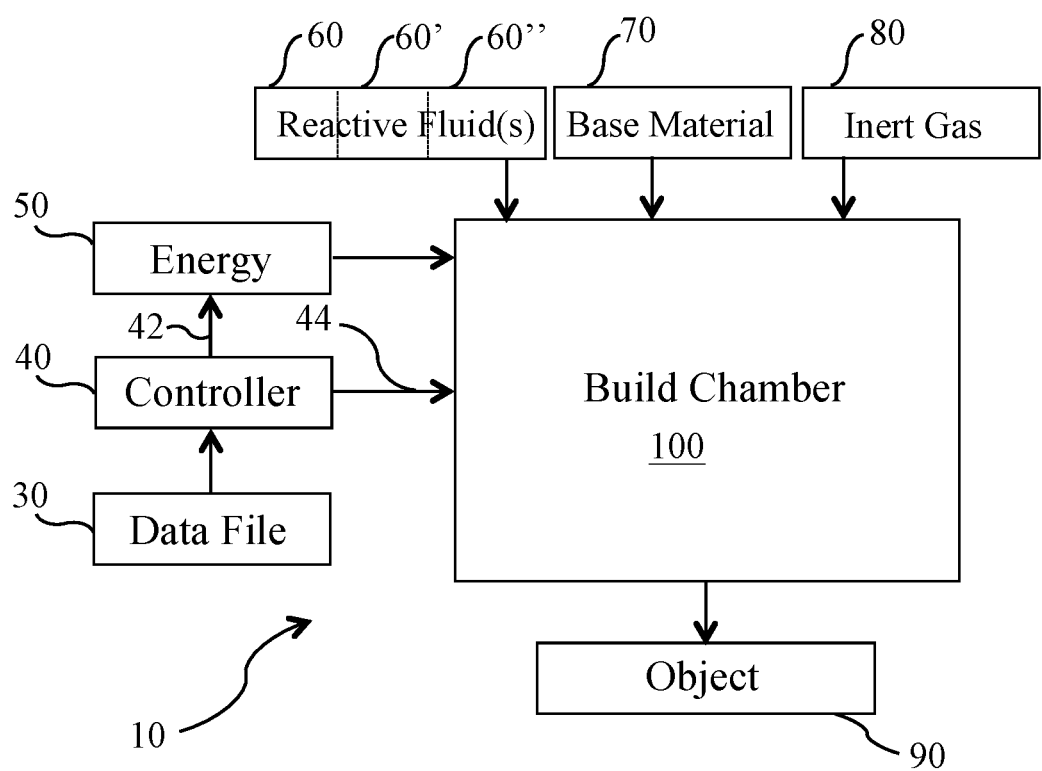
FIG. 1 depicts a diagram of an additive manufacturing apparatus encompassing one aspect of the present invention wherein the reactive fluid(s) and base material are contacted with one another inside of the build chamber.

In the appended figures, similar components and/or features may have the same reference label. Further, various components of the same type may be distinguished by following the reference label by a dash and a second label that distinguishes among the similar components. If only the first reference label is listed in the specification, the description is applicable to anyone of the similar components having the same first reference label irrespective of the second reference label.

DETAILED DESCRIPTION OF THE INVENTION

The following definitions apply to the present invention.

The term "AM processes" (also, "additive manufacturing" processes) as used herein refers to any process which results in a useful, three-dimensional object and includes a step of sequentially forming the shape of the object one layer at a time. AM processes include electron-beam melting (EBM), selective laser melting (SLM) or direct metal laser sintering (DMLS), direct metal laser melting (DMLM), selective laser sintering (SLS), fused deposition modeling (FDM), fused filament fabrication (FFF), or powder bed and inkjet head 3D printing (3DP) processes, laser-net-shape manufacturing, direct metal laser sintering (DMLS), plasma transferred arc, freeform fabrication, etc. A particular type of AM process uses an energy beam, for example, an electron beam or electromagnetic radiation such as a laser beam, to sinter or melt a powder material. AM processes often employ relatively expensive materials such as but not limited to, powders, metal powder materials, rods, liquids or wire as a raw material.

For the sake of clarity, the following discussion, while directed towards metallic powders, contemplates the use of any materials, such as, but not limited to powders, rods, liquids, or wires and therefore should not be viewed or seen as a limitation. The present invention relates generally to AM processes as a rapid way to manufacture an object (article, component, part, product, etc.) where a multiplicity of thin unit layers are sequentially formed to produce the object. More specifically, layers of a metallic powder are laid down and irradiated with an energy beam (e.g., laser beam) so that particles of the metallic powder within each layer are sequentially sintered (fused) or melted to solidify the layer or substrate. According to an aspect of the invention, one or more reactive fluids or fluid mixtures that react with the surface of the metallic powder or powders is brought into contact with the metallic powder prior to during and/or after the AM process to actively manipulate the surface chemistry of the powder material thus the chemical composition of the surface of the powder material is controlled/reformed/modified before, during and/or after the AM process. Fluids including gas mixtures containing hydrogen, carbon monoxide or other gas components that chemically reduce surface oxides and/or otherwise clean or remove impurities on the surface of solid powders are used instead of or in addition to pure purge gases (e.g. He, Ar or $N_2$) in the build chamber itself, as well as in the metallic-powder-delivery line, the metallic-powder-delivery container, or in the used-metallic-powder receiver.

The present invention includes bulk modification of a base material, for example a very thin film/layer (such as those less than 1 micron), it is feasible to modify the property of whole by exposing it to reactive fluids with energy assistance (such as thermal diffusion in semiconductor manufacturing).

The present invention includes the treatment of a base material by a gas or gases including gas mixtures and could be employed to recycle used metallic powders, which leads to the cost reduction of powders. At the same time, the gases with higher thermal conductivity (e.g. He) could be employed as a purge gas or a balance gas, which is effective to reduce the residual stress derived from temperature gradients.

The present invention may further employ gases including gas mixtures to remove hydrogen in the powders or fabricated products and/or intentionally oxidize the surface of powders. As discussed previously, hydrogen on the base material's surface and within fabricated products are known to cause hydrogen embrittlement. According to the present invention, gases including gas mixtures containing CO, $CO_2$, and/or fluorocarbons are utilized to remove hydrogen to enhance the mechanical strength of fabricated products. In addition to these gases, oxygen, ozone, and/or hydrogen peroxide are utilized not only to remove hydrogen but also to form metal oxides materials.

The present invention further contemplates the use of gases including gas mixtures to form nitride, carbide, boride, phosphide, silicide or other chemical layer on the surface of base materials to enhance the wear resistance or corrosion resistance of the fabricated products. Any combinations of these gases can be used to form binary, ternary, or higher order compounds such as nitride and boride at the same time. It is further contemplated that gases/fluids including their mixtures may be used to alter the alloy composition of the powder material before and/or during additive manufacturing. Gases/fluids containing volatile organometallic components can be used to introduce or deposit metals by chemical vapor deposition, atomic layer deposition or other process on the surface of powders as they are used in the 3D printing process.

Detailed descriptions of laser sintering/melting technology may be found in U.S. Pat. Nos. 4,863,538, 5,017,753, 5,076,869, and 4,944,817. With this type of manufacturing process, a laser beam is used to selectively fuse a powder material by scanning cross-sections of the material in a bed. These cross-sections are scanned based on a three-dimensional description of the desired object. This description may be obtained from various sources such as, for example, a computer aided design (CAD) file, scan data, or some other source.

In one embodiment, the AM apparatus comprises a build chamber within which an article can be fabricated, a movable build platform positioned within the build chamber and on which the article is fabricated, a base material/fluid delivery system, and an energy delivery system. The base material/fluid delivery system delivers a base material that has been chemically modified to the build platform. In an optional embodiment, a heating system may be employed that is capable of heating the base material and the platform with a heated gas. By conforming to the shape of the object, the base material is only needed for portions of the movable platform on which the process is to be performed.

According to certain aspects of the invention, the base material can be a metallic material, non-limiting examples of which include aluminum and its alloys, iron and its alloys, titanium and its alloys, nickel and its alloys, stainless steels, cobalt-chrome alloys, tantalum, and niobium. While the reactive fluid is chosen based on the specific metallic material being used and the desired surface chemistry. Non-limiting examples of reactive fluid contemplated by this invention include highly diffusive gases and/or gas mixtures such as reducing, oxidizing reagent, reactive gases or reactive fluids. Fluids including gas mixtures containing hydrogen, carbon monoxide or other gas components that chemically reduce surface oxides and/or otherwise clean or remove impurities on the surface of the base materials are used instead of or in addition to pure purge gases (e.g. He, Ar or $N_2$) in the build chamber itself, as well as in the base material delivery line, the base material container, or in the used base material receiver.

Methods of producing a three-dimensional structure may include depositing a first layer of one or more of the aforementioned base materials on the platform thereby forming a substrate. At least one additional layer of base material is deposited and then the laser scanning steps for each successive layer are repeated thereby forming a thicker substrate until a desired object is obtained. In fabricating a three-dimensional structure, the base material can be actively modified by changing the reactive gas during the layering process. The article is formed in layer-wise fashion until completion. In the present invention, there is no particular limitation on the particle shape of the base material used in an embodiment of the present invention. For powders, the average grain size is, in an embodiment, about 10 to 100 μm. Properties of metallic powders or metallic products are improved during product fabrication by spatio-temporally (chamber/line/container, continuously/cyclically/multiple-steps) controlled chemical reaction during the AM process.

In certain embodiments, the present invention provides for a higher purity metal product that has an improvement of phase, crystal structure, and metallurgical structure of base materials in addition to a high dimensional accuracy and excellent microstructural characteristics, for example, characterized by the substantial absence of microstructural defects such as voids, impurities, inclusions, and particularly microcracks and porosity, without employing metal stamping, even though the product may be formed of a pure metal of choice and/or an alloy-based powder material that is considered to be resistant to sintering. Furthermore, the present invention provides a methodology for modification of the magnetic properties and residual stress in a fabricated product.

The AM process according to the present invention may be carried out under an inert atmosphere wherein the base material has been stored in or reacted with the reactive fluid prior to entering the build chamber. In such a case, the inert atmosphere is an atmosphere comprising a gas selected from the group consisting of helium, argon, hydrogen, oxygen, nitrogen, air, nitrous oxide, ammonia, carbon dioxide, and combinations thereof. In one embodiment, the inert atmosphere is an atmosphere comprising a gas selected from the group consisting of nitrogen ($N_2$), argon (Ar), helium (He) and mixtures thereof. In one embodiment, the inert atmosphere is substantially an argon gas atmosphere. Alternatively, AM process according to the present invention is carried out under an atmosphere of the desired reactive fluid wherein the base material has been stored in or reacted with the reactive fluid prior to entering the build chamber.

With reference now to FIG. 1, a diagram of an AM apparatus 10 is depicted in accordance with one embodiment of the present invention. In the particular example illustrated in FIG. 1, the additive manufacturing (AM) device 10 includes a build chamber 100 having a movable build platform (not shown) upon which an object 90 is to be fabricated. The AM device 10 further includes an energy generating system 50 and a controller 40. In the illustrative example, a reactive fluid 60 or reactive fluids 60' and 60" is contacted with base material 70 as they are introduced into build chamber 100 of the AM device 10 to create an object 90 using energy generated by the generating system 50. When base material 70 is contacted with reactive fluid 60 the surface of base material modified as desired resulting in modified base material 75 (not shown). The modification to the surface of base material 70 may be a chemical modification, a coating and/or the result of the adsorption of the reactive fluid 60. AM device is capable of introducing an inert gas 80 if necessary. Object 90 may take various forms. Controller 40 sends control signals 42 to generating system 50 and control signals 44 to build chamber 100 to control the heating and, in some embodiments, melting of modified base material 75 to form object 90. These control signals 42 and 44 may be generated using design data 30.

Operator specified values can be computer fed into controlled to specify quantities and types of reactive gases that will contact base material 70 thus allowing for the operator to specifically design the chemical profile of each layer within object 90 during the actual fabrication process. Different profiles and repetition rates within the release of at least one reactive gas (60, 60' and/or 60") with respect to the course or progress of the layers being deposited can therefore be defined and varied.

Figure 2:
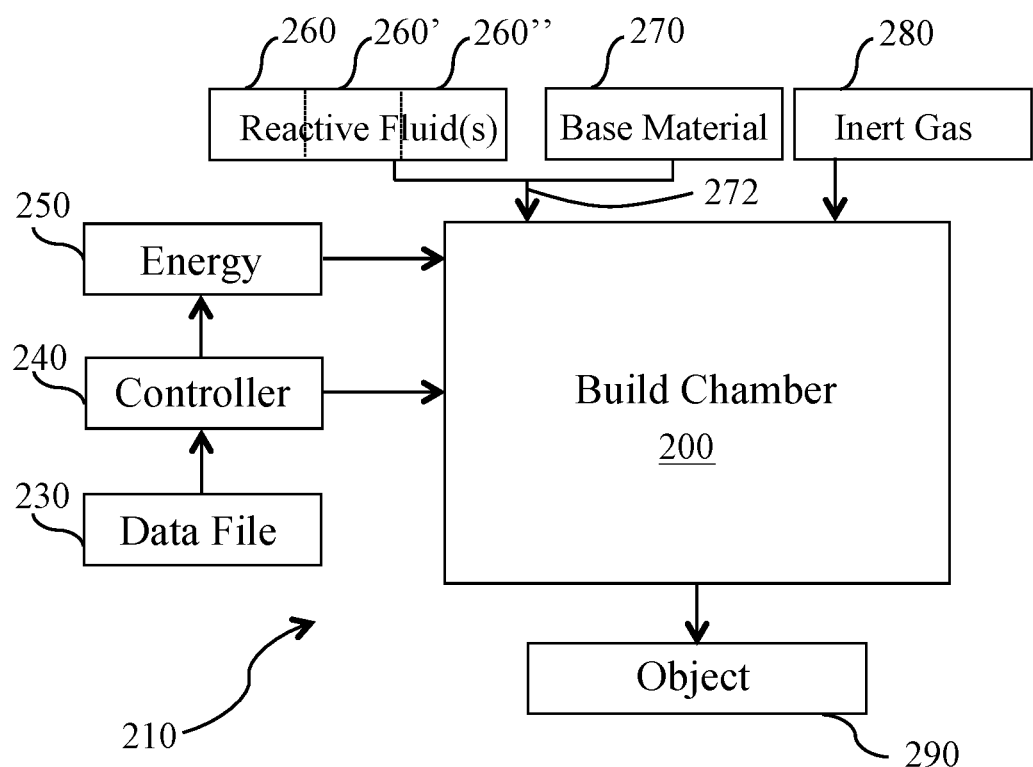
FIG. 2 depicts a diagram of an additive manufacturing apparatus encompassing one aspect of the present invention wherein the reactive fluid(s) and base material are contacted with one another prior to entering the build chamber.
Figure 3:
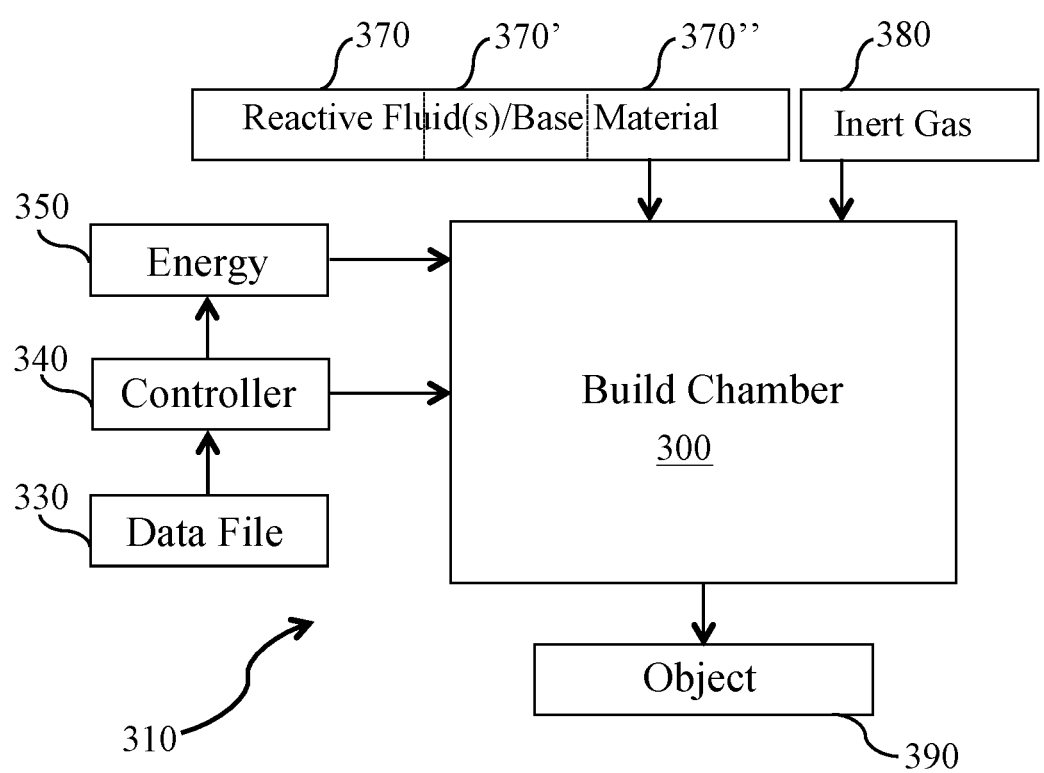
FIG. 3 depicts a diagram of an additive manufacturing apparatus encompassing one aspect of the present invention wherein the reactive fluid(s) and base material are stored within the same container and have contacted one another prior to entering the build chamber.

The illustration of the AM device 10 in FIG. 1 is not meant to imply physical and/or architectural limitations to the manner in which different environments may be implemented. For example, in other embodiments, as shown in FIGS. 2 and 3 the reactive gas is contacted with the base material at differing times. For example, in one embodiment as shown in FIG. 2, reactive fluid 260 and base material 270 are contacted together in supply line 272 thereby providing more time for the chemical reaction to take place on the surface of base material 270. It may also be beneficial to expose the mixture of base material and reactive gas 260 to a heating step, so supply line 272 may run through an external energy source (not shown) prior to introduction into the build chamber. Again, as discussed previously, the modified base material (not shown) is then directed into build chamber 200 where object 290 is fabricated. An alternate embodiment shown in FIG. 3 is provided that not only has the benefit of modifying the surface chemistry of base material, but by storing and transporting the base material with reactive fluid 370 an enhanced safety, handling, delivery of some base material is achieved. For example, low-oxygen containing powders or fine particles are explosive and by suspending them in the reactive fluid 370 the handling and safety of those materials is considerably increased. Table 1 below provide various example of reactive fluids and where that reaction in the AM process with the metallic material is to take place.

TABLE 1

| Process | Gas Examples | Reaction Location | Effect |
|---|---|---|---|
| Reducing process | $H_2$, CO, HCOOH, $NH_3$, $N_2H_4$, monomethyl hydrazine, 1,2-dimethylhydrazine, hydrocarbon | In chamber In powder supply line In powder supply container In powder recycle container | High purity metal leads to high mechanical strength and highly dense Above + More cost effective |
| Oxidizing process | CO, $CO_2$, $O_2$ fluorocarbon $H_2O_2$, $O_3$, NO, $N_2O$, $NO_2$ | In chamber | High purity metal leads to high mechanical strength |
| Compounding (Group III, IV, V) process | $NH_3$, $N_2H_4$, 1,2-dimethylhydrazine, monomethylhydrazine, dimethylamine, monomethylamine hydrocarbon, $B_2H_6$, alkylborane, $H_2S$, alkyl sulfur, $PH_3$, alkyl phosphine, $BCl_3$ | In chamber | Chemical resistant, wear resistant |
| Alloying process | $WF_6$, alkyl aluminum, any organometallic, trimethylgallium, alkyl gallium | In chamber | Chemical resistant, wear resistant |

The additive manufacturing device 10, shown in FIG. 1, may be constructed by modifying currently available laser sintering or melting systems. The different embodiments may be achieved by replacing the inert gas typically found on these systems with reactive gas.

One of the greatest sources of difficulty in the production of parts using prior LAM processes with powder material is the high reactivity of the surface of the powder material with air and/or oxygen, thus the creation of residual stresses and imperfections during the fabrication of parts. As discussed below, contacting a reactive fluid with a metallic powder is believed to be capable of reducing the magnitude of residual stresses due to impurities, voids or inclusions thus making higher purity metals, parts, or products. Furthermore, the operator of the additive manufacturing device is able to tune the mechanical/chemical properties of each individual layer, including the surface of the fabricated object through use of reactive fluids thus providing some additional geometric freedom and process robustness. Improving the material usage efficiency, e.g. recycling, reducing the waste and enhanced safety, handling, delivery of oxidizable powders is also achieved.

In view of the above, the apparatus 10 is capable of processing a wide variety of materials, including but not limited to the following discussed below.

Aluminum and its alloys: The base material 70 may be pure aluminum or an aluminum alloy. The base material 70 also may be a mixture of particles of pure aluminum and one or more aluminum alloys or may be a mixture of various aluminum alloys. There are no restrictions on the composition of an aluminum base material 70 other than it is to contain sufficient aluminum in metallic form for the powder material particles to form a substantially enveloping film of alumina.

Base material 70 may further be nickel and nickel alloys including nickel-based superalloys; copper and its alloys; refractory metals, including noble metals and metalloids and/or materials having a high oxidation potential, for example, copper, iron, titanium, ruthenium, cadmium, zinc, rhodium, potassium, sodium, nickel, bismuth, tin, barium, germanium, lithium, strontium, magnesium, beryllium, lead, calcium, molybdenum, tungsten, cobalt, indium, silicon, gallium, iron, zirconium, chromium, boron, manganese, aluminum, lanthanum, neodymium, niobium, vanadium, yttrium, and/or scandium.

Base material 70 may further be metallic glasses or amorphous metallic compounds; ternary, quaternary, or higher-order metallic alloys having amorphous structures, for example, aluminum-titanium-based alloy such as Ti—Al—Fe and Ti—Al—N, zirconium-based alloy such as Zr—Cu—Al—Ni, palladium-based alloy such as Pd—Ni—P, iron-based alloy comprising the combination of iron, boron, silicon, carbon, phosphorous, nickel, cobalt, chromium, nitrogen, titanium, zirconium, vanadium, and niobium. In fabricating these metallic glasses, boron, phosphorous, silicon, carbon, and/or any other element can be added within the apparatus 10 using reactive fluids like diborane, phosphine, and methane. The present invention could be applied for formation of amorphous metallic oxides, for example, In—Ga—Zn—O and Zn—Rh—O. Oxides could be formed within the apparatus 10 using reactive fluids like oxygen or hydrogen peroxide.

The present invention could select various reactive fluids, for example, (1) reducing agents: hydrogen, carbon monoxide, formic acid, ammonia, hydrazine, monomethyl hydrazine, 1,2-dimethyl hydrazine;

(2) carbonizing agent and carbiding agent: saturated hydrocarbons such as methane, ethane, propane, butane, pentane, hexane, heptane, and higher hydrocarbons, unsaturated hydrocarbons such as acetylene, propylene, isomers of butene, ethylene;

(3) oxidizing agent: carbon dioxide, oxygen, carbon tetrafluoride, fluoroform, methylene difluoride, fluoromethane, hydrogen peroxide, ozone, nitrous oxide, nitric oxide, nitrogen dioxide, nitrogen trifluoride, fluorine;

(4) nitriding agent: monomethylamine, dimethylamine, trimethylamine, ammonia, hydrazine, monomethyl hydrazine, 1,2-dimethyl hydrazine;

(5) boriding agent: diborane, trimethyl borane, tetramethyl diborane, trichloroborane, trifluoroborane;

(6) sulfiding agent: hydrogen sulfide, methanethiol, ethanethiol, propanethiol, butanethiol, pentanethiol, dialkylsulfides;

(7) phosphiding agent: phosphine, tert-butylphosphine, triethylphosphine, trimethylphosphine, phosphorous oxychloride, trifluorophosphine, trichlorophosphine:

(8) silanizing agent: monosilane, disilane, higher silanes, alkyl silanes, tetraethoxysilane, fluorosilanes, chlorosilanes, aminosilanes;

(9) seleniding agent: hydrogen selenide, alkyl selenides;

(10) plasma and supercritical fluid;

(11) others: tungsten hexafluoride, trimethylaluminum, tetraethylaluminum, trimethylgallium, tetraethylgallium, tetrachlorotitanium, transition metal compounds; tungstenizing agents; and

(12) combinations thereof.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, materials and methods according to some embodiments are described herein. While the invention has been described in detail herein in accord with certain preferred embodiments thereof, many modifications and changes therein may be effected by those skilled in the art. Without further elaboration it is believed that one skilled in the art can, using the description set forth above, utilize the invention to its fullest extent.

Having disclosed several embodiments, it will be recognized by those of skill in the art that various modifications, alternative constructions, and equivalents may be used without departing from the spirit of the disclosed embodiments. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the dielectric material" includes reference to one or more dielectric materials and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. An additive manufacturing method of fabricating an object on a build platform positioned within a build chamber, the method comprising:
   introducing one or more first reactive gases into said build chamber;
   introducing into said build chamber a first quantity of at least one base material, wherein said introducing step occurs without the application of energy that would alter the chemical or physical state of said first quantity of base material, said base material having a surface that is capable of being (a) chemically modified to a desired chemistry, (b) cleansed of impurities, or (c) both (i) chemically modified to a desired chemistry and (ii) cleansed of impurities;
   reacting said one or more first reactive gases solely with said first quantity of at least one base material, at a reaction zone within said build chamber spaced apart from the deposition location, wherein said reacting occurs in the absence of applied energy thereby producing during said introduction a modified base material;
   depositing on the build platform said at least one modified base material;
   applying energy to said at least one deposited modified base material to form (a) a chemically modified first layer or substrate, (b) an impurity free first layer or substrate, or (c) an impurity free chemically modified first layer or substrate;
   forming at least one additional modified layer on said (a) chemically modified first layer or substrate, (b) impurity free first layer or substrate, or (c) impurity free chemically modified first layer or substrate by reacting within said build chamber, at a reaction zone within said build chamber spaced apart from the deposition location, wherein said reacting occurs in the absence of applied energy, a second quantity of said at least one additional base material having a surface that is capable of being (a) chemically modified to a desired chemistry, (b) cleansed of impurities, or (c) both (i) chemically modified to a desired chemistry and (ii) cleansed of impurities, solely with one or more additional reactive gases, without the application of energy that would alter the chemical or physical state of said second quantity of additional base material, to produce at least one or more additional modified base material wherein said one or more additional reactive gases are
   (A) the same as said one or more first reactive gases; and
      (i) reactive with said at least one additional base material having said surface capable of modification to a desired chemistry by said one or more first reactive gases;
      (ii) reactive with said impurity located on the surface of said at least one additional base material having said surface capable of modification to a desired chemistry by said one or more first reactive gases; or
      (iii) reactive with said impurity located on the surface of said at least one additional base material; or
   (B) different than said one or more first reactive gases; and
      (i) reactive with said at least one additional base material having said surface capable of modification to a desired chemistry by said one or more-first additional reactive gases; or
      ii) reactive with said impurity located on the surface of said at least one additional base material having said surface capable of modification to a desired by said one or more additional reactive gases; or
      (iii) reactive with said impurity located on the surface of said at least one additional base material;
   depositing on said modified first layer or substrate said at least one additional modified base material;
   applying energy to said at least one additional modified base material deposited upon said (a) chemically modified first layer or substrate, (b) impurity free first layer or substrate, or (c) impurity free chemically modified first layer or substrate so as to form and fuse said at least one additional modified layer to said (a) chemically modified first layer or substrate, (b) impurity free first layer or substrate, or (c) impurity free chemically modified first layer or substrate; and continuing to form additional modified layers until the fabrication of the object is complete.

2. The additive manufacturing method of claim 1, wherein said impurity on said surface of at least one base material and on said surface of at least one additional modified base material is reactive to said one or more first reactive gases and said one or more additional reactive gases is selected from the group consisting of hydrogen, metal oxides, metal nitrides, and water vapor.

3. The additive manufacturing method of claim 1, wherein said modified base material and at least one additional modified base material reduce at least one microstructural defect in said first layer or said substrate and at least one additional layer, respectively, and said at least one microstructural defect is chosen from the group consisting of impurity, microcracks and porosity.

4. The additive manufacturing method of claim 1, wherein the modified surface of said at least one base material and at least one additional base material results in a modification of phase, crystal structure, and metallurgical structure of said base material and at least one additional base material.

5. The additive manufacturing method of claim 1, wherein the modified surface of said at least one base material and at least one additional base material results in the modification of the magnetic properties of said fabricated object.

6. The additive manufacturing method of claim 1, wherein the modified surface of said at least one base material and at least one additional base material results in the modification of the residual stress properties in said fabricated object.

7. The additive manufacturing method of claim 1, wherein said at least one base material and said at least one additional base material are selected from the group consisting of a powder material, plasma, rod, wire or fluid.

8. The additive manufacturing method of claim 7, wherein said powder material is a metallic powder material.

9. The additive manufacturing method of claim 8, wherein said metallic powder material is a metallic glass or amorphous metallic compound material.

10. The additive manufacturing method of claim 8, wherein said metallic powder material is selected from the group consisting of aluminum, nickel, iron, titanium, copper, refractory metals, and alloys thereof wherein the surface of said metallic powder oxidizes when in contact with.

11. The additive manufacturing method of claim 8, wherein water vapor absorbed into said metallic powder material constitutes an impurity.

12. The additive manufacturing method of claim 1, wherein said first reactive gas and said additional reactive gases are selected from the group consisting of reducing agents; carbonizing agents; oxidizing agents; nitriding agents; boriding agents; sulfiding agents; phosphiding agents; silanizing agents; seleniding agents; tungstenizing agents; carbiding agents; and combinations thereof.

13. The additive manufacturing method of claim 1, further comprising a step of cutting the fabricated object with a laser to form a new surface and then exposing said new surface to said at least one reactive gas.

14. The additive manufacturing method of claim 1, wherein said applied energy is an electron beam treatment.

15. The additive manufacturing method of claim 13, wherein said new surface of which portions or all are capable of modification to a desired chemistry by said one or more reactive gas.

16. The additive manufacturing method of claim 1, wherein said surface capable of modification to a desired chemistry is coated by said one or more reactive gas.

17. An additive manufacturing method of fabricating an object on a build platform positioned within a build chamber, the method comprising:

introducing into said build chamber and depositing on the build platform a first quantity of at least one base material, wherein said introducing and depositing step occur without the application of energy that would alter the chemical or physical state of said first quantity of base material, said base material having a surface that is capable of being (a) chemically modified to a desired chemistry, (b) cleansed of impurities, or (c) both (i) chemically modified to a desired chemistry and (ii) cleansed of impurities;

introducing one or more first reactive materials into said build chamber;

reacting said one or more first reactive materials with said deposited first quantity of at least one base material, wherein said reacting step occurs in the absence of energy and only after said depositing step has been completed, thereby producing a modified base material, wherein said modified base material reacted solely with one or more first reactive materials, consisting of one or more first gases;

applying energy to said at least one deposited modified base material to form (a) a chemically modified first layer or substrate, (b) an impurity free first layer or substrate, or (c) an impurity free chemically modified first layer or substrate;

forming at least one additional modified layer on said (a) chemically modified first layer or substrate, (b) impurity free first layer or substrate, or (c) impurity free chemically modified first layer or substrate by depositing a second quantity of said at least one additional base material having a surface that is capable of being (a) chemically modified to a desired chemistry, (b) cleansed of impurities, or (c) both (i) chemically modified to a desired chemistry and (ii) cleansed of impurities on said modified first layer or substrate and reacting said second quantity of said at least one additional base material, in the absence of energy, with one or more additional reactive materials consisting of one or more gases to produce at least one or more additional modified base material wherein said one or more additional reactive gases are (A) the same as said one or more first reactive gases; and
  (i) reactive with said at least one additional base material having said surface capable of modification to a desired chemistry by said one or more first reactive gases;
  reactive with said impurity located on the surface of said at least one additional base material having said surface capable of modification to a desired chemistry by said one or more first reactive gases; or
  (iii) reactive with said impurity located on the surface of said at least one additional base material; or (B) different than said one or more first reactive gases; and
  (i) reactive with said at least one additional base material having said surface capable of modification to a desired chemistry by said one or more additional reactive gases; or
  (ii) reactive with said impurity located on the surface of said at least one additional base material having said surface capable of modification to a desired by said one or more additional reactive gases or (iii) reactive with said impurity located on the surface of said at least one additional base material;

applying energy to said at least one additional modified base material deposited upon said (a) chemically modified first layer or substrate, (b) impurity free first layer or substrate, or (c) impurity free chemically modified first layer or substrate so as to form and fuse said at least one additional modified layer to said (a) chemically modified first layer or substrate, (b) impurity free first layer or substrate, or (c) impurity free chemically modified first layer or substrate; and continuing to form additional modified layers until the fabrication of the object is complete.

\* \* \* \* \*